United States Patent
Nakayama et al.

[15] 3,650,897
[45] Mar. 21, 1972

[54] PROCESS FOR PRODUCING 5-FLUOROURACIL RIBOSIDE AND 6-MERCAPTOPURINE RIBOSIDE

[72] Inventors: Kiyoshi Nakayama, Sagamihara-shi; Takashi Nara, Tokyo; Masanaru Misawa, Kawasaki-shi; Toshio Komuro, Machida-shi, all of Japan

[73] Assignee: Kyowa Hakko Kogyo Co., Ltd., Tokyo, Japan

[22] Filed: July 15, 1968

[21] Appl. No.: 744,690

Related U.S. Application Data

[63] Continuation of Ser. No. 565,089, July 14, 1966, abandoned.

[30] Foreign Application Priority Data

July 19, 1965 Japan....................................40/43227

[52] U.S. Cl. ...........................................................195/28 N
[51] Int. Cl. .....................................................C12d 13/06
[58] Field of Search ................................................195/28 N

[56] References Cited

UNITED STATES PATENTS

| | | | |
|---|---|---|---|
| 3,269,917 | 8/1966 | Imada et al. | 195/28 N |
| 3,298,923 | 1/1967 | Banno et al. | 195/28 N |
| 3,366,550 | 1/1968 | Nakayama et al. | 195/28 N |

FOREIGN PATENTS OR APPLICATIONS 672,274 10/1963 Canada..............................195/28 N Primary Examiner—Alvin E. Tanenholtz
Attorney—Craig, Antonelli & Hill

[57] ABSTRACT

A process for producing 5-fluorouracil or 6-mercaptopurine riboside by fermentation which comprises culturing a microorganism belonging to *Bacillus subtilis* or *Streptomyces fradiae* in an aqueous nutrient medium under aerobic conditions. In the case of 5-fluorouracil riboside, 5-fluorouracil is added to the medium and in the case of 6-mercaptopurine riboside, 6-mercaptopurine is added to the medium. The products have been reported as being useful as antagonistic agents of nucleic acid metabolism and as anti-cancer agents.

9 Claims, No Drawings

PROCESS FOR PRODUCING 5-FLUOROURACIL RIBOSIDE AND 6-MERCAPTOPURINE RIBOSIDE

CROSS-REFERENCE TO RELATED APPLICATION

This application is a continuation of copending application Ser. No. 565,089, filed on July 14, 1966 and now abandoned.

This invention relates to a process for producing 5-fluorouracil riboside and 6-mercaptopurine riboside. More particularly, it relates to a process for the production of 5-fluorouracil riboside and 6-mercaptopurine riboside by fermentation. Even more particularly, the invention relates to a process for the production of 5-fluorouracil riboside and 6-mercaptopurine riboside by fermentation in the presence of certain micro-organisms and additives.

5Fluorouracil riboside and 6mercaptopurine riboside have the following structural formulas:

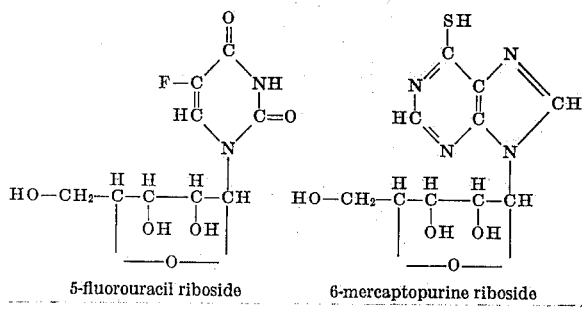

5-fluorouracil riboside     6-mercaptopurine riboside

These compounds are the ribosides of 5-fluorouracil and 6-mercaptopurine. The latter compounds have received attention as anti-cancer agents (for example, U. S. Pat. Nos. 2,721,866 and 2,724,711 of Hitchings et al.). The compounds of the present invention are of importance as antagonistic agents of nucleic acid metabolism and as anti-cancer agents (for example, A. Lindner et al., Experimental Cell Research, Supplement Vol. 9, p. 485 – 511, 1963 for 5-fluorouracil riboside, and Brit. Patent 936,654 of Wellcome Foundation Ltd., I. Goodman et al., Federation Proceedings Vol. 14, p. 219, 1955 for 6-mercaptopurine riboside).

One of the objects of the present invention is to provide a process for the production of 5-fluorouracil riboside and 6-mercaptopurine riboside by fermentation which may be carried out in an efficacious and simple manner.

Another object of the present invention is to provide a process for producing 5-fluorouracil riboside and 6-mercaptopurine riboside by fermentation which gives the product in high purity and good yield.

A further object of the invention is to provide a process for producing 5-fluorouracil riboside and 6-mercaptopurine riboside by fermentation which may be carried out advantageously on an industrial scale at low cost to give a high yield of product.

These and other objects and advantages of the present invention will become apparent to those skilled in the art from a consideration of the following specification and claims.

In accordance with the present invention, it has been found that remarkably large quantities of 5-fluorouracil riboside or 6-mercaptopurine riboside are accumulated in the fermentation liquor and may be recovered therefrom if fermentation or culturing is carried out with micro-organisms capable of producing these compounds, such as *Bacillus subtilis*, *Streptomyces fradiae* and the like, and adding 5-fluorouracil or 6-mercaptopurine, depending upon which product is desired, to the culture medium. This latter addition may be made at any time during the culturing. The nucleoside corresponding to the respective base added to the medium thus accumulates in large quantities as a result thereof.

The general conditions of culturing are those conventionally used in the art for fermentation processes. Either a synthetic culture medium or a natural nutrient medium is suitable in the present invention as long as it contains the essential nutrients for the growth of the strain employed. Such nutrients are well known in the art and include substances such as a carbon source, a nitrogen source, inorganic compounds and the like which are utilized by the micro-organism employed in appropriate amounts. Thus, as a carbon source, carbohydrates such as glucose, fructose, maltose, sucrose, starch, starch hydrolysate, etc., may be employed. Of course, other carbon sources such as glycerol, organic acids, glutamic acid and the like may be employed. A single carbon source may be used, or a mixture of two or more. As a nitrogen source, various kinds of inorganic or organic salts or compounds, such as urea or ammonium salts such as ammonium chloride, ammonium sulfate, ammonium nitrate, ammonium phosphate, etc., or natural substances containing nitrogen, such as cornsteep liquor, yeast extract, meat extract, peptone, fish meal, casein hydrolysate, casamino acid, fish solubles, rice bran extract, etc., may be used. Again, the nitrogen-containing substances may be used either singly or in combinations of two or more. Inorganic compounds which may be added to the culture medium include salts such as magnesium sulfate, sodium phosphate, potassium dihydrogen phosphate, potassium monohydrogen phosphate, iron sulfate or other iron salts, manganese chloride, calcium chloride, as well as other appropriate salts of manganese, zinc and the like.

Fermentation is carried out under aerobic conditions, such as aerobic shaking of the culture or with stirring of a submerged culture with aeration, at a temperature of about 20° to 40°C. and a pH of about 5.0 to 9.0. After about 2 to 10 days of culturing, remarkably large amounts of the particular nucleoside desired, whether it be 5-fluorouracil riboside or 6-mercaptopurine riboside depending upon the particular base added to the culture medium, are accumulated in the culture liquor as well as in the cell bodies themselves.

After the completion of culturing, the 5-fluorouracil riboside or 6-mercaptopurine riboside may be recovered from the fermentation liquor by conventional means, such as ion exchange resin treatment, extraction with solvents, precipitation with metallic salts, adsorption, and the like.

The amount of 5-fluorouracil or 6-mercaptopurine base to be added ranges from about 0.1 to 10 mg./ml. of culture medium.

The following examples are given merely as illustrative of the present invention and are not to be considered as limiting. Unless otherwise noted, the percentages therein are by weight per liter of water.

EXAMPLE I

*Bacillus subtilis* ATCC 19062 is used as the seed bacterium. This strain is cultured in a culture medium consisting of 2% of glucose, 1% of peptone, 1% of yeast extract, 0.25% of NaCl and 30 μg./l. of biotin at 30°C. for 24 hours. The pH of the culture medium is adjusted to 7.3.

The resultant seed medium is inoculated in an amount of 10 percent by volume into the following fermentation medium composition:

```
10% glucose
1% yeast extract
1% (NH4)2SO4
0.6% K2HPO4
0.6% KH2PO4
0.6% MgSO4·7H2O
2% CaCO3
```

The pH of the fermentation medium is adjusted to 8.2 with 5N sodium hydroxide before sterilization thereof. Then, 30 ml. portions of the mixture of seed and fermentation media are poured into individual 250 ml. conical flasks and sterilized.

Culturing is then carried out with aerobic shaking at 30°C. After 68 hours of culturing, 5-fluorouracil is added to the culture liquor to give a concentration thereof of 2 mg./ml. After 120 hours of culturing, 2.5 mg./ml. of 5-fluorouracil riboside is found to be accumulated in the fermentation liquor. The resultant 5-fluorouracil riboside is recovered by chromatography on Dowex 1 (trade name of a polystyrene strongly anionic ion exchange resin of the Dow Chemical Co.) (formate type).

EXAMPLE II

The same seed strain, seed medium and fermentation medium as described in Example I are employed. After 68 hours of culturing, 6-mercaptopurine is added to the medium, instead of 5-fluorouracil, to give a concentration thereof of 2.0 mg./ml. After 120 hours of culturing, 0.89 mg./ml. of 6-mercaptopurine riboside is accumulated in the fermentation liquor. The resultant 6-mercaptopurine riboside is recovered from the fermentation liquor by a combination of a chromatography procedure on Dowex 1 (trade name of the polystyrene strongly anionic exchange resin of the Dow Chemical Co.) (formate type) and a carbon adsorption-desorption method.

EXAMPLE III

*Streptomyces fradiae* ATCC 19063 is employed as the seed bacterium. The same culture medium and fermentation medium as described in Example I are used. After 68 hours of culturing, 6-mercaptopurine is added to the culture liquor in an amount so as to give a concentration thereof of 2.0 mg./ml. therein. After 120 hours of culturing, 0.42 mg./ml. of 6-mercaptopurine riboside is found to be accumulated in the fermentation liquor.

The invention being thus described, it will be obvious that the same may be varied in many ways. Such variations are not to be regarded as a departure from the spirit and scope of the invention, and all such modifications as would be obvious to one skilled in the art are intended to be included herein.

What is claimed is:

1. A process for producing a compound selected from the group consisting of 5-fluorouracil riboside and 6-mercaptopurine riboside which consists essentially of culturing a micro-organism capable of producing said compound and belonging to *Bacillus subtilis* or *Streptomyces fradiae* in an aqueous nutrient medium under aerobic conditions in the presence of a base selected from the group consisting of 5-fluorouracil, in the case of the production of 5-fluorouracil riboside, and 6-mercaptopurine, in the case of the production of 6-mercaptopurine riboside, and recovering the resultant compound from the fermentation liquor.

2. The process of claim 1, wherein said base is added to the medium prior to the initiation of culturing.

3. The process of claim 1, wherein said base is added to the medium during culturing.

4. The process of claim 1, wherein said culturing is carried out at a temperature of from about 20° to 40° C. and a pH of about 5.0 to 9.0.

5. The process of claim 4, wherein said micro-organism is *Bacillus subtilis* ATCC 19062.

6. The process of claim 4, wherein said micro-organism is *Streptomyces fradiae* ATCC 19063.

7. The process of claim 4, wherein said compound is 5-fluorouracil riboside and said base is 5-fluorouracil.

8. The process of claim 4, wherein said compound is 6-mercaptopurine riboside and said base is 6-mercaptopurine.

9. The process of claim 4, wherein the amount of said base ranges from about 0.1 to 10 mg./ml. of culture medium.

* * * * *